United States Patent
Bonjean et al.

(10) Patent No.: US 9,408,399 B2
(45) Date of Patent: Aug. 9, 2016

(54) PACKAGED POWDER COMPOSITION FOR BAKERY

(75) Inventors: Bernard Bonjean, Marbais (BE); Stefan Cappelle, Onkerzele (BE); Pierre Tossut, Remicourt (BE); Christophe Dewilde, Mount Laurel, NJ (US)

(73) Assignee: Puratos NV, Groot-Bijgaarden (BE)

( * ) Notice: Subject to any disclaimer, the term of this patent is extended or adjusted under 35 U.S.C. 154(b) by 2143 days.

(21) Appl. No.: 11/570,921

(22) PCT Filed: Jun. 29, 2005

(86) PCT No.: PCT/BE2005/000103
§ 371 (c)(1),
(2), (4) Date: Jun. 30, 2008

(87) PCT Pub. No.: WO2006/000065
PCT Pub. Date: Jan. 5, 2006

(65) Prior Publication Data
US 2008/0260904 A1     Oct. 23, 2008

(30) Foreign Application Priority Data
Jun. 29, 2004   (EP) .................................... 04447156

(51) Int. Cl.
*A21D 10/00* (2006.01)
*A21D 8/04* (2006.01)

(52) U.S. Cl.
CPC .............. *A21D 10/00* (2013.01); *A21D 8/047* (2013.01)

(58) Field of Classification Search
CPC .............................. A21D 10/00; A21D 8/047
See application file for complete search history.

(56) References Cited

U.S. PATENT DOCUMENTS

| | | | |
|---|---|---|---|
| 3,843,800 A | * | 10/1974 | Langejan ..................... 426/18 |
| 3,993,783 A | | 11/1976 | Langejan et al. |
| 4,217,420 A | | 8/1980 | Langejan |
| 4,328,250 A | | 5/1982 | Clement et al. |
| 4,341,871 A | | 7/1982 | Langejan et al. |
| 4,870,801 A | * | 10/1989 | Mizandjian et al. ............ 53/432 |
| 5,384,139 A | | 1/1995 | Vasseneix |

FOREIGN PATENT DOCUMENTS

| | | |
|---|---|---|
| DE | 35 04 686 A1 | 8/1986 |
| EP | 0 159 891 A1 | 10/1985 |
| EP | 0 375 558 A1 | 6/1990 |
| GB | 1230205 A | 4/1971 |
| GB | 2009583 A | 6/1979 |
| WO | WO 03/090543 A2 | 11/2003 |

OTHER PUBLICATIONS

Dixon, Brian "How to Tell When a Starter is a Starter". Retrieved online from www.faqs.org/faqs/food/sourdough/starters/ and available online from Feb. 19, 2003. pp. 1-14.*

(Continued)

*Primary Examiner* — Jenna A Watts
(74) *Attorney, Agent, or Firm* — Knobbe Martens Olson & Bear, LLP (57) ABSTRACT

The present invention relates to a new product for bakery industry comprising a stable powdered composition, said powdered composition comprising active yeast and a bread improvement composition, and optionally a bread flavor composition. The present invention also relates to its use and a process for its preparation.

27 Claims, 1 Drawing Sheet

(56) References Cited

OTHER PUBLICATIONS

"Sourdough", retrieved online from tyler.net/jpwright/sourdo.htm, available online from Jun. 25, 2004. pp. 1-5.*
Citation 1 from the European opposition against the corresponding European granted case No. 1 761 130 B1, containing photographs of DCL Instant Yeast packages alleged by the opponent to have been commercially available since Nov. 1999.
Foremost Farms USA. Dec. 2004. Reddi-Sponge®—Dough Conditioner Code 439 datasheet.
Notice of Opposition dated Dec. 1, 2011, against corresponding European Patent No. 1 761 130 B1, in 5 pages.
Filing of Notice of Opposition dated Dec. 1, 2011, against corresponding European Patent No. 1 761 130 B1 in 10 pages, with translation in 10 pages.
Electronic Receipt of Filing of Notice of Opposition dated Dec. 1, 2011, against corresponding European Patent No. 1 761 130 B1, in 2 pages.
Communication of a Notice of Opposition—First Information to Patent Proprietor dated Dec. 9, 2011, in corresponding European Patent No. 1 761 130 B1, in 1 page.
Notice of Further Oppositions to Opponent(s) dated Jan. 11, 2012, in corresponding European Patent No. 1 761 130 B1, in 1 page.
Communication of a Notice of Opposition and Request to File Observations dated Jan. 11, 2012, in corresponding European Patent No. 1 761 130 B1, in 1 page.
Request for Extension of Time Limit dated May 7, 2012, in corresponding European Patent No. 1 761 130 B1, in 2 pages.
Acknowledgement of Receipt dated May 7, 2012, in corresponding European Patent No. 1 761 130 B1, in 1 page.
Grant of Extension of Time Limit dated May 15, 2012, in corresponding European Patent No. 1 761 130 B1, in 1 page.
Brief Communication regarding Opposition Proceedings dated May 15, 2012, in corresponding European Patent No. 1 761 130 B1, in 1 page.
Reply of the Patent Proprietor to the Notice(s) of Opposition dated Jul. 18, 2012, in corresponding European Patent No. 1 761 130 B1, in 5 pages.
Letter Regarding the Opposition Procedure (No Time Limit) dated Jul. 18, 2012, in corresponding European Patent No. 1 761 130 B1, in 2 pages.
Acknowledgement of Receipt dated Jul. 18, 2012, in corresponding European Patent No. 1 761 130 B1, in 1 page.
Brief Communication regarding Opposition Proceedings dated Jul. 24, 2012, in corresponding European Patent No. 1 761 130 B1, in 1 page.
Request for Change of Opponent's Representative dated Jul. 26, 2012, in corresponding European Patent No. 1 761 130 B1, in 1 page.
Preparation for Oral Proceedings—Instructions to Support Service coded May 16, 2013, in corresponding European Patent No. 1 761 130, 2 pages.
Summons to attend oral proceedings mailed to Cabinet Plasseraud on May 27, 2013, in corresponding European Patent No. 1 761 130, 3 pages.
Summons to attend oral proceedings mailed to Pronoven Office Van Malderen on May 27, 2013, in corresponding European Patent No. 1 761 130, 3 pages.
European Patent Office Information Concerning Oral Proceedings Form 2043 entered in European Patent Register on May 27, 2013, in corresponding European Patent No. 1 761 130, 3 pages.
Annex to Opposition Communication, Facts and Submissions, dated May 27, 2013, in corresponding European Patent No. 1 761 130, 5 pages.
Request for acknowledgment of receipt mailed to Cabinet Plasseraud on May 27, 2013, in corresponding European Patent No. 1 761 130, 1 page.
Request for acknowledgment of receipt mailed to Pronovem Office Van Malderen on May 27, 2013, in corresponding European Patent No. 1 761 130, 1 page.
Signed acknowledgment of receipt of Pronovem Office Van Malderen faxed to EPO on May 30, 2013 at 14:40, in corresponding European Patent No. 1 761 130, 1 page.
Signed acknowledgment of receipt of Pronovem Office Van Malderen faxed to EPO on May 30, 2013 at 14:44, in corresponding European Patent No. 1 761 130, 1 page.
Signed acknowledgment of receipt of Cabinet Plasseraud faxed to EPO on Jun. 3, 2013 at 17:17, in corresponding European Patent No. 1 761 130, 1 page.
Airmail delivery confirmation of Pronovem Office Van Malderen dated Jun. 3, 2013, in corresponding European Patent No. 1 761 130, 1 page.
Airmail delivery confirmation of Cabinet Plasseraud dated Jun. 6, 2013, in corresponding European Patent No. 1 761 130, 1 page.
Request for interpreters during oral proceeding dated Jul. 12, 2013, in corresponding European Patent No. 1 761 130, 1 page.
Brief communication—Opposition proceedings, dated Jul. 25, 2013, in corresponding European Patent No. 1 761 130, 1 page.
Request for interpreters during oral proceedings, letter, acknowledgment receipt, dated Aug. 13, 2013, in corresponding European Patent No. 1 761 130, 3 pages.
Brief communication—Opposition proceedings, dated Aug. 19, 2013, in corresponding European Patent No. 1 761 130, 1 page.
Reply to Examination Report, Auxiliary requests, Annexes, dated Aug. 22, 2013, in corresponding European Patent No. 1 761 130, 26 pages.
Brief communication—Opposition proceedings, dated Aug. 28, 2013, in corresponding European Patent No. 1 761 130, 1 page.
Letter regarding the opposition procedure, dated Sep. 2, 2013, in corresponding European Patent No. 1 761 130, 1 page.
Information about the result of oral proceedings, dated Sep. 24, 2013, in corresponding European Patent No. 1 761 130, 1 page.
Minutes of the oral proceedings—conclusion of the proceedings, documents for the maintenance of the patent as amended, annex to the communication, internal form, dated Oct. 17, 2013, in corresponding European Patent No. 1 761 130, 9 pages.
Interlocutory decision in opposition proceedings, Grounds for the decision (Annex)—opposition, Druckexemplar in opposition proceeding, Decision of the Opposition Division and instruction, and acknowledgment of a document, dated Feb. 7, 2014, in corresponding European Patent No. 1 761 130, 46 pages.
Advice of delivery, Cabinet Plasseraud, dated Feb. 14, 2014, in corresponding European Patent No. 1 761 130, 1 page.
Advice of delivery, Pronovem Office Van Malderen, dated Feb. 17, 2014, in corresponding European Patent No. 1 761 130, 2 pages.
Advice of delivery by airmail, dated Feb. 18, 2014, in corresponding European Patent No. 1 761 130, 2 pages.
Catinet Plasseraud, Notice of Appeal, dated Apr. 4, 2014, in corresponding European Patent No. 1 761 130, 2 pages.
European Patent Office, Letter Accompanying Subsequently Filed Items, dated Apr. 4, 2014, in corresponding European Patent No. 1 761 130, 2 pages.
European Patent Office, Electronic Receipt, dated Apr. 4, 2014, in corresponding European Patent No. 1 761 130, 1 page.
European Patent Office, Processing of an Appeal, dated Apr. 9, 2014, in corresponding European Patent No. 1 761 130, 2 pages.
European Patent Office, Board of Appeals, EPO Form 3204, Communication of the File Number to the Parties, Pronovem-Office Van Malderen, dated Apr. 14, 2014, in corresponding European Patent No. 1 761 130, 1 page.
European Patent Office, Board of Appeals, EPO Form 3204, Communication of the File Number to the Parties, Cabinet Plasseraud, dated Apr. 14, 2014, in corresponding European Patent No. 1 761 130, 1 page.
European Patent Office, Board of Appeals, EPO Form 3303.13, Composition of the Board, dated Apr. 29, 2014, in corresponding European Patent No. 1 761 130, 1 page.
Cabinet Plasseraud, Statement of Grounds of Appeal, dated Jun. 12, 2014, in corresponding European Patent No. 1 761 130, 7 pages, with English translation, 7 pages.
European Patent Office, Letter Accompanying Subsequently Filed Items, dated Jun. 12, 2014, in corresponding European Patent No. 1 761 130, 1 page.

(56) References Cited

OTHER PUBLICATIONS

European Patent Office, Electronic Receipt, dated Jun. 12, 2014, in corresponding European Patent No. 1 761 130, 1 page.
European Patent Office, Board of Appeals, EPO Form 3344, Setting Time Limit for Reply/File Observations to Appeal (Inter Partes), dated Jun. 18, 2014, in corresponding European Patent No. 1 761 130, 1 page.
European Patent Office, Board of Appeals, Fax Relating to Appeal Procedure, dated Aug. 8, 2014, in corresponding European Patent No. 1 761 130, 4 pages.
Ernest Gutmann Yves Plasseraud SAS, Request for Change of Applicant's Representative, dated Aug. 20, 2014, in corresponding European Patent No. 1 761 130, 1 page.
European Patent Office, Board of Appeals, EPO Form 3345, Forwarding of Submissions to Parties, dated Aug. 20, 2014, in corresponding European Patent No. 1 761 130, 1 page.
European Patent Office, Authorisation of Representative, dated Aug. 20, 2014, in corresponding European Patent No. 1 761 130, 1 page.
European Patent Office, Board of Appeals, EPO Form 3345, Forwarding of Submissions to Parties, dated Aug. 27, 2014, in corresponding European Patent No. 1 761 130, 1 page.
European Patent Office, Communication of Amended Entries Concerning the Representative, dated Aug. 27, 2014 in corresponding European Patent No. 1 761 130, 1 page.
European Patent Office, Communication Concerning the Filing of a Power of Attorney, dated Aug. 27, 2014, in corresponding European Patent No. 1 761 130, 3 pages.
European Patent Office, Brief Communication—Opposition Proceedings, dated Aug. 27, 2014, in corresponding European Patent No. 1 761 130, 2 pages.
Ernest Gutmann Yves Plasseraud SAS, Request for Extension of Time Limit, dated Oct. 10, 2014, in corresponding European Patent No. 1 761 130, 1 page.
European Patent Office, Letter Accompanying Subsequently Filed Items, dated Oct. 10, 2014, in corresponding European Patent No. 1 761 130, 1 page.
European Patent Office, Electronic Receipt, dated Oct. 10, 2014, in corresponding European Patent No. 1 761 130, 1 page.
European Patent Office, Board of Appeal, Term Extension, Cabinet Plasseraud, dated Oct. 17, 2014, in corresponding European Patent No. 1 761 130, 1 page.
European Patent Office, Board of Appeal, Term Extension, Ernest Gutmann Yves Plasseraud, dated Oct. 17, 2014, in corresponding European Patent No. 1 761 130, 1 page.
Ernest Gutmann Yves Plasseraud SAS, Reply to Appeal, dated Dec. 18, 2014, in corresponding European Patent No. 1 761 130, 12 pages.
Ernest Gutmann Yves Plasseraud Patent Letter Relating to Appeal Procedure, D5, dated Dec. 18, 2014, in corresponding European Patent No. 1 761 130, 6 pages.
Ernest Gutmann Yves Plasseraud SAS, Letter Relating to Appeal Procedure, dated Dec. 18, 2014, D8, Food Packaging Technology, p. 284, in corresponding European Patent No. 1 761 130, 3 pages.
Ernest Gutmann Yves Plasseraud SAS, Letter Relating to Appeal Procedure, dated Dec. 18, 2014, D6, Arôme Levain, F100 Technical Data Sheet, in corresponding European Patent No. 1 761 130, 6 pages.
Ernest Gutmann Yves Plasseraud SAS, Letter Relating to Appeal Procedure, dated Dec. 18, 2014, D7, Richard Gullickson, Reference Data Sheet on Inert Gases and Atmospheres (Dec. 1996), in corresponding European Patent No. 1 761 130, 1 page.
European Patent Office, Letter Accompanying Subsequently Filed Items, dated Dec. 18, 2014, in corresponding European Patent No. 1 761 130, 1 page.
Auxiliary Request 1—Claims, dated Dec. 18, 2014, in corresponding European Patent No. 1 761 130, 3 pages.
Auxiliary Request 2—Claims, dated Dec. 18, 2014, in corresponding European Patent No. 1 761 130, 3 pages.
Auxiliary Request 1—Amended Claims with Annotations, dated Dec. 18, 2014, in corresponding European Patent No. 1 761 130, 3 pages.
Auxiliary Request 2—Amended Claims with Annotations, dated Dec. 18, 2014, in corresponding European Patent No. 1 761 130, 3 pages.
European Patent Office, Electronic Receipt, dated Dec. 18, 2014, in corresponding European Patent No. 1 761 130, 2 pages.
European Patent Office, Board of Appeals, Patent Form 3345, Forwarding of Submissions to Parties, dated Jan. 5, 2015, in corresponding European Patent No. 1 761 130, 1 page.

\* cited by examiner

PACKAGED POWDER COMPOSITION FOR BAKERY

RELATED APPLICATIONS

This application is the U.S. National Phase under 35 U.S.C. §371 of International Application No. PCT/BE2005/000103, filed Jun. 29, 2005, published in English on Jan. 5, 2006, as WO 2006/000065, which claims priority to European Application No. 04447156.3, filed Jun. 29, 2004.

FIELD OF THE INVENTION

The present invention relates to a new packaged product for bakery industry comprising a stable powdered composition, said powdered composition comprising active yeast(s) and a bread improvement composition, and optionally a bread flavour composition. The present invention also relates to its use and a process for its preparation.

BACKGROUND OF THE INVENTION

Currently, many bakery ingredients (salt, flour, yeasts, enzymes, aromas, etc) are dosed separately. There are several disadvantages coupled therewith.

Separate dosing increases the risk of faults as well as the labor costs incurred with said dosing. In case of powdered products, the investments in separate dosing are further significantly higher compared to a single dosing system since all screws, all motors and automation has to be multiplied by the number of separate dosing points. Powdered dosing systems are also less accurate, or they require huge investments for automation. The dust production due to the dosing of powdered products is an increasing problem in the bakery due to its allergic properties. In terms of waste disposal, separate packaging will generate much more waste compared to an all in-one solution. Separate products increase the number of stock keeping units, complicating the logistic organization of the bakery as well as a decreased working capital due to immobilization of capital into stocks.

For these reasons, ready-to-use sourdough base compositions have been developed and liquid sourdough base compositions have entered the market as bakery ingredients.

There are many attempts to supply the yeasts together with chemical additives (or dough conditioners) such as oxidizing and reducing agents, emulsifiers, fatty materials, enzymes, etc (also referred to as improvers).

EP 0619947 for instance, describes the co-formulation of yeasts and improvers, and proposes to solve the problem of the instability of the composition by extruding the mixture.

EP 1090553 and the parent patent EP 0659344 describe a composition where the bread-improving agent has the same particle size as the dry yeast, which is in granular form. An alternative consists of coating the dry yeast granules with the bread-improving agent, in the form of a film or adhered particles.

But these proposed solutions involve further steps in the process and further equipments. Moreover, they do not solve another problem encountered when the mix of dry yeast and improvers (such as emulsifiers) is packed under vacuum: the product tends to make a bloc, difficult to break (referred to as the caking).

SUMMARY OF THE INVENTION

It was found that it was possible to combine or admix a dough conditioner composition with active yeast(s) in a powdered formulation, and optionally a bread flavour improvement composition, and optionally salt, to obtain a powdered composition which is stable when packaged under inert atmosphere, with a volume ratio "inert atmosphere/powdered composition" comprised between about 50/50 and about 4/96, preferably comprised between about 30/70 and about 4/96, and more preferably comprised between about 10/90 and about 5/95.

The present invention also relates to the use of a (bakery) product of the invention (powdered composition packaged under inert atmosphere, with a volume ratio "inert atmosphere/powdered composition" comprised between about 50/50 and about 4/96, preferably comprised between about 30/70 and about 4/96, and more preferably comprised between about 10/90 and about 5/95) for the preparation of bread, cake, biscuits, pastries, snacks, pizza, etc.

Figure 1:
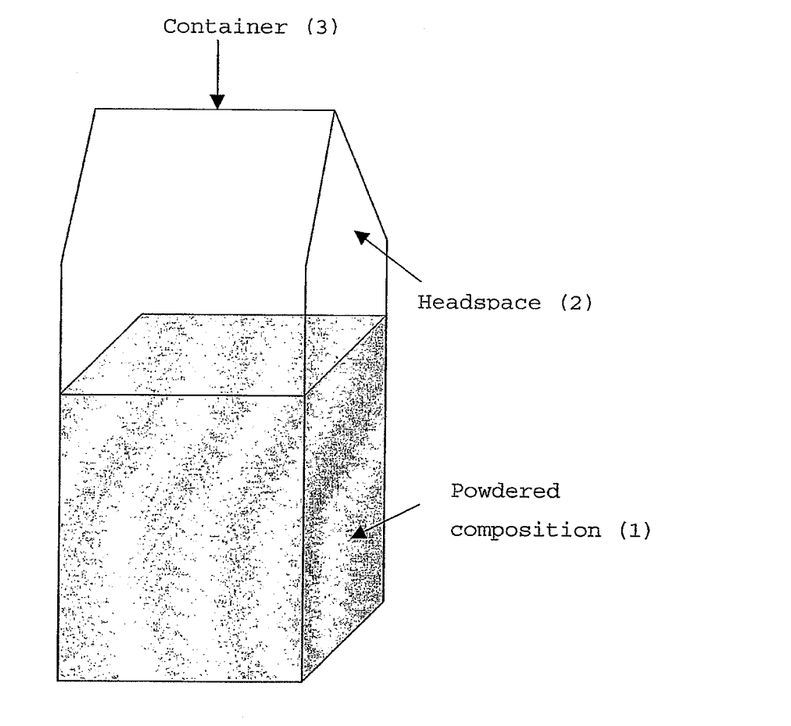
FIG. 1 represents a (bakery) product of the invention.

The present invention also relates to a process for the preparation of a powdered composition of active yeast(s) and improvers, packaged under inert atmosphere, wherein the volume ratio "inert atmosphere/powdered composition" is comprised between about 50/50 and about 4/96, preferably comprised between about 30/70 and about 4/96, and more preferably comprised between about 10/90 and about 5/95. More particularly, the present invention provides a (bakery) product comprising a powdered composition (1) that comprises an improver composition and an active yeast, said powdered composition (1) being packaged into a container (3), the headspace (2) of which, after sealing, consists essentially of at least about 5% of inert atmosphere, based on the total volume of said container (3).

In a (bakery) product according to the invention said powdered composition may further comprise a flavour improvement composition and/or (a) flavour improvement compound(s) and/or salt.

Preferably, said improver composition comprises:
  one or more enzymes selecting from the group consisting of amylases, xylanases, lipases, oxidases, dehydrogenases, laccases and proteases, and/or
  one or more oxidizing or reducing agents, and/or
  one or more emulsifiers, and/or
  one or more fatty materials, and/or
  one or more vitamins, and/or
  one or more sources of fibre, or
  a mixture of two or more thereof.

Preferably, said flavour improvement composition comprises a sourdough product or a sponge product, or a mixture thereof.

Preferably, said flavour improvement compound(s) comprise(s) one or more natural aroma compounds, one or more chemical aroma compounds, one or more acids and/or one or more acidifying agents, or a mixture of two or more thereof.

Preferably, said inert atmosphere consists of nitrogen, argon, helium, or carbon dioxide, or a mixture of two or more thereof.

Preferably, said flavour improvement composition and said active yeast have a dry matter of minimum 94%.

Preferably, the residual oxygen content is less than about 2%, based on the gas-phase volume in the container, after sealing.

Preferably, the residual humidity content is less than about 6%, based on the weight of said powdered composition.

Preferably, said container is a multilayer based films impermeable to oxygen and to humidity.

The present invention also provides a process for the preparation of a (bakery) product comprising the steps of:
  admixing an improver composition and an active yeast, both in powder form, optionally adding a bread flavour improvement composition in powder form, optionally adding (a) bread flavour improvement compound(s) in powder form, optionally adding salt, filling a container with the resulting powdered composition, and sealing said container under inert atmosphere, while leaving a headspace of at least 5% based on the volume of said container, said headspace consisting essentially of said inert atmosphere.

Preferably, in a process of the invention, said improver composition comprises:

one or more enzymes selecting from the group consisting of amylases, xylanases, lipases, oxidases and proteases, and/or one or more oxidizing or reducing agents, and/or one or more emulsifiers, and/or one or more fatty materials, and/or one or more vitamins, One or more sources of fibre, or a mixture of two or more thereof.

Preferably, in a process of the invention, said flavour improvement composition comprises a sourdough product, or a sponge product, or a mixture thereof.

Preferably, in a process of the invention, said inert atmosphere consists of nitrogen, argon, helium, or carbon dioxide, or a mixture of two or more thereof.

The present invention also relates to the use of a (bakery) product of the invention (powdered composition packaged under inert atmosphere, wherein the volume ratio "inert atmosphere/powdered composition" is comprised between about 50/50 and about 4/96, preferably comprised between about 30/70 and about 4/96, and more preferably comprised between about 10/90 and about 5/95) for the preparation of bread, cake, biscuits, pastries, snacks or pizzas.

DETAILED DESCRIPTION OF THE INVENTION

The term "flavour improvement system", "flavour improvement composition", "bread flavour improvement composition" refer to a sourdough or a sourdough product; a bakery sponge or a sponge product.

The terms "(bread) flavour (improvement) compounds" and "(bread) flavour (improvement) substances" refer to substances added in relation to the flavour, such as natural and/or chemical aroma compounds, acids or acidifying agents (producing acid and/or gas), or a mixture of two or more thereof.

The term "sourdough" refers to a dough fermented by lactic acid bacteria and/or yeast(s), having a characteristic acidic flavour due to the lactic acid bacteria producing mainly lactic acid, acetic acid and some minor compounds and/or the typical flavour top-notes produced by the yeast (s).

The term "sourdough product" refers to the product above, that is stabilized in one or another way (e.g. through drying, pasteurization, cooling, freezing, etc) so that this product can be added to a regular dough, thereby replacing the in-bakery produced pre-fermentation.

The term "sponge" refers to a dough fermented by yeast(s), having a characteristic flavour due to said yeast(s) fermentation. It is a pre-fermentation product based on a yeast fermentation of part of the flour.

The term "sponge product" refers to the stabilized form of such a regular bakery sponge fermentation, used to enhance the flavour in a regular dough. It can be a sponge extract.

The terms "bread improvement system", "bread improvement composition", "dough conditioner composition", "(bread) improver composition" and "improver(s)" refer to one or more substances or compositions added to the dough in order to improve dough handling properties and/or quality of the final baked product. These substances can be enzymes or (chemical) additives such as oxidizing/reducing agents, emulsifiers, fatty materials, vitamins, etc.

There is a wide range of enzymes that can be used for bread improvement purposes, such as amylases, xylanases, lipases, oxidases (e.g. glucose oxidase, carbohydrate oxidase, hexose oxidase, etc), proteases, dehydrogenases, laccases, and others described as such in the literature and patents.

In the context of the present invention, the term "bakery product" refers to a "product for bakery industry".

The present invention relates to a (bakery) product (or a product for bakery industry) comprising (or consisting of) a powdered composition that comprises an improver composition and active yeast (s), said powdered composition being packaged under inert atmosphere with a volume ratio (inert atmosphere/powdered composition) comprised between about 50/50 and about 4/96, preferably between about 30/70 and about 4/96, and more preferably between about 10/90 and about 4/96.

A (bakery) product (or a product for bakery industry) of the invention comprises (or consists of) a powdered composition that comprises an improver composition and active yeast(s), said powdered composition being packaged into a container, the headspace of which, after sealing, consisting essentially of at least about 4%, preferably at least about 5% of inert atmosphere based on the total volume of said container. The remaining volume is occupied by the said powdered composition.

A product for bakery industry of the invention may also be defined as comprising (or consisting of) a container and a powdered composition, said powdered composition comprising an improver composition and active yeast, wherein the headspace of said container, after sealing, consists (essentially) of at least 5% of inert atmosphere, based on the total volume of said container.

In a (bakery) product (or a product for bakery industry) of the invention a powdered composition may further comprise a flavour improvement composition and/or (a) flavour improvement compound(s) and/or salt.

The improver composition used in a (bakery) product (or product for bakery industry) of the invention, can comprise or consist of:

one or more enzymes selecting from the group consisting of amylases, xylanases, lipases, oxidases, proteases, dehydrogenases and laccases, and/or one or more oxidizing or reducing agents such as ascorbic acid, glutathione, cystein, and/or one or more emulsifiers, such as DATEM®, SSL®, CSL®, GMS®, rhamnolipids, lecithines, sucroesters, bile salts, and/or one or more fatty materials, e.g. margarin, butter, oil, and/or one or more vitamins, e.g. pantothenic acid, vitamin E, and/or one or more sources of fibre, e.g. oat fibre.

It may also consist of a mixture of two or more of the listed components.

The flavour improvement composition used in a (bakery) product (or a product for bakery industry) of the invention, can comprise or consist of (in their powder form) a sourdough product or a sponge product, or a mixture thereof.

The flavour improvement compounds used in a (bakery) product (or a product for bakery industry) of the invention, can comprise or consist of one or more natural aroma compounds, one or more chemical aroma compounds, one or more acids and/or one or more acidifying agents (producing acid and/or gas), or a mixture of two or more thereof.

In the context of the present invention, the term "headspace" refers to the volume left at the top of the almost filled container before or after sealing.

In the context of the present invention, the term "about", when associated with the headspace, the oxygen or humidity, means +/−0.5%. For example, "about 4%" means that 4.5%, 4.4%, 4.3%, 4.2%, 4.1%, 3.9%, 3.8%, 3.7%, 3.6% or 3.5% are also encompassed.

In a (bakery) product (or a product for bakery industry) of the invention, the headspace of the container may consists of 50%, 45%, 40%, 35%, 30%, 25%, 20% or 15% of inert atmosphere based on the total volume of said container. The remaining volume occupied by the said powdered composition is thus respectively 50%, 55%, 60%, 65%, 70%, 75%, 80% or 85% based on the total volume of said container.

In a preferred (bakery) product (or product for bakery industry) of the invention, the headspace of the container consists of more than about 10%, 9%, 8%, 7%, 6%, 5%, or more than about 4% of inert atmosphere based on the total volume of said container.

In a preferred (bakery) product (or product for bakery industry) of the invention, the headspace of the container consists of about 10%, 9%, 8%, 7%, 6%, 5%, or about 4% of inert atmosphere based on the total volume of said container, and the remaining volume occupied with respectively about 90%, 91%, 92%, 93%, 94%, 95% or about 96% of said powdered composition based on the total volume of said container.

The active yeast preferably used in a (bakery) product (or a product for bakery industry) of the present invention is Instant Active Dry Yeast, which is active yeast having a dry matter of minimum 94%, and packed under vacuum.

The inert atmosphere used in a (bakery) product (or a product for bakery industry) of the invention can consist of any non reactive gas, or gas that has a high threshold before it reacts, such as nitrogen, argon, helium, or carbon dioxide, or a mixture of two or more thereof. Nitrogen is preferred in the framework of the present invention.

The term "essentially" means that the inert atmosphere used in a (bakery) product (or a product for bakery industry) of the invention may contain oxygen referred to as the residual oxygen content.

In a preferred (bakery) product (or product for bakery industry) of the invention, the residual oxygen content is less than about 5% based on the gas-phase volume in the container, after sealing.

In a more preferred (bakery) product (or product for bakery industry) of the invention, the residual oxygen content is less than about 2%, preferably less than about 1% and more preferably less than about 0.5% based on the gas-phase volume in the container, after sealing.

The container preferably used in a (bakery) product (or a product for bakery industry) of the present invention is any multilayer based films designed for food applications.

Said container (or packaging means) may have different forms, and more particularly can be a bag.

Said container may comprise (or consists of) polyester, aluminium and polyethylene.

The polyester can allow the printing, and the polyethylene can allow the sealing at high temperature.

The aluminium acts as oxygen barrier.

Preferably, said container comprises (about) 17 g/m² of polyester, (about) 19 g/m² of aluminium and (about) 92 g/m² of polyethylene.

There is no need to add a polyamide layer which is usually used for packing under vacuum.

Preferably, said container (or bag) has a thickness of about 119 microns. It is thicker than the packaging means usually used for active dried yeast, which is about 106 microns.

Advantageously, said container further comprises an easy opening system, i.e. a system (or means) provided for opening said container (e.g. a bag) without any cutting material. Said easy opening system may result from a special coating system applied only on a specific area where the sealing will be done.

Said container must be impermeable to oxygen and to humidity.

Indeed, the residual humidity must be kept as low as possible. In a preferred (bakery) product (or a product for bakery industry) of the invention, the residual humidity is less than 10%, preferably less than 6% and more preferably less than 5% based on the weight of the powdered composition.

A (bakery) product (or a product for bakery industry) according to the present invention can be stored for a long time at ambient temperature.

In a (bakery) product (or a product for bakery industry) according to the present invention, the bread improvement composition is sufficiently stable and the results in dough and/or bread improvement properties are comparable to those obtained when the components are each dosed separately, even after 12 months of storage. Moreover the yeast remains sufficiently stable and shows a gassing production capacity comparable to any regular instant active dry yeast.

The present invention also relates to a process for the preparation of a (bakery) product (or a product for bakery industry) comprising the steps of (or consisting of):

admixing an improver composition and active yeast (s), both in powder form,
  optionally adding a bread flavour improvement composition in powder form,
  optionally adding (a) bread flavour improvement compound(s) in powder form,
  optionally adding salt,
  filling a container with the resulting powdered composition, and
  sealing said container under inert atmosphere, preferably nitrogen, with a volume ratio, inert atmosphere/powdered composition, comprised between about 50/50 and about 4/96, preferably between about 30/70 and about 4/96, and more preferably between about 10/90 and about 5/95.

In a process of the invention, the container is sealed under inert atmosphere, preferably under nitrogen, so that a headspace of at least about 4%, preferably at least about 5% based on the total volume of said container is left. The headspace, after sealing, contains essentially inert atmosphere, preferably nitrogen, and the remaining volume is occupied by the said powdered composition.

In a process of the invention, the headspace of the container may consists of 50%, 45%, 40%, 35%, 30%, 25%, 20% or 15% of inert atmosphere based on the total volume of said container. The remaining volume occupied by the said powdered composition is thus respectively 50%, 55%, 60%, 65%, 70%, 75%, 80% or 85% based on the total volume of said container.

In a preferred process of the invention, the headspace of the container consists of more than about 10%, 9%, 8%, 7%, 6%, 5%, or more than about 4% of inert atmosphere based on the total volume of said container.

In a preferred process of the invention, the headspace of the container consists of about 10%, 9%, 8%, 7%, 6%, 5% or about 4% of inert atmosphere based on the total volume of said container, and the remaining volume occupied with respectively about 90%, 91%, 92%, 93%, 94%, 95% or about 96% of said powdered composition based on the total volume of said container.

The headspace may also contain less than about 5% oxygen based on the gas-phase volume in the container, after sealing. This oxygen content is referred to as the residual oxygen content.

In a preferred process of the invention, the residual oxygen content is less than about 2%, preferably less than about 1% and more preferably less than about 0.5% based on the gas-phase volume in the container, after sealing.

The container can be any container designed for food applications, impermeable to oxygen and humidity.

A preferred container is made of multilayer laminate films with barriers against oxygen and humidity.

The powdered composition in a (bakery) product (or a product for bakery industry) of the invention can be used as a powdered leaven composition and/or for the preparation of bread, cake, biscuits, pastries, snacks, pizza, etc.

The invention will be described in further details in the following examples, which are intended for illustration purposes only, and should not be construed as limiting the scope of the invention in any way.

EXAMPLES

Example 1

A sourdough product, i.e. a stabilized dough fermented by lactic acid bacteria and/or yeast, is dried and put into powder form. The residual humidity content is 5% based on the weight of the sourdough. In other words, the dry matter of the sourdough is 95%.

In parallel, a bread improver composition is prepared by blending:
Ascorbic acid, and
Enzymes: Bel'ase A75® which is a fungal amylase (BELDEM, Belgium) and Bel'ase B210®, which is a bacterial xylanase (BELDEM, Belgium).

The components mentioned above, together with yeast, which consists of instant active dry yeast with a 96% dry matter, and salt, are transferred into a container.

The proportions of the different components used in the powdered composition are summarised in Table 1.

TABLE 1

| Components | Proportion (1) | Proportion (2) |
|---|---|---|
| Sourdough | 533.2 | 535.2 |
| Instant active dry yeast | 129.15 | 129.15 |
| Ascorbic acid | 1.5 | 1.5 |
| Bel'ase B210 (Beldem, BELGIUM) | 0.5 | 0.5 |
| Bel'ase A75 (Beldem, BELGIUM) | 0.25 | 0.25 |
| Salt | 333.4 | 333.4 |
| Total | 998 | 1000 |

The powdered sourdough, the yeast, salt and improvers are sealed, under nitrogen, in a container (a multilayer based films with barriers against oxygen and humidity), so that a headspace of 5% based on the volume of said container is left, filled with the nitrogen. The residual oxygen content is 1% based on the gas-phase volume in the container.

Example 2

A stability follow-up is made by preparing a dough using the (bakery) product (or product for bakery industry) of the invention, prepared according to example 1, which has been stored at 47° C. during seven days. These storage conditions are considered to reflect the stability of the yeast for a period of two years.

The dough consists of 280 g of flour, 162 ml of water and 6%—based on the weight of the flour—of the powdered composition of the (bakery) product (or product for bakery industry) of the invention after 7 days of storage at 47° C. The temperature of the water is 30° C. The ingredients are mixed during six minutes, with the temperature of the dough maintained at 30° C.

Comparative tests are also performed by preparing different sets of dough with compositions (having the same ingredients as the (bakery) product (or product for bakery industry) of the invention, in the same proportions) kept for different period of time, in different storage conditions, as described in Table 2.

TABLE 2

| Conditions | Ref n° |
|---|---|
| Open pack stored at 4° C. | 1 |
| Closed pack under vacuum stored at 4° C. | 2 |
| Open pack stored at 20° C. | 3 |
| Closed pack under vacuum stored at 20° C. | 4 |
| Closed pack under vacuum stored at 47° C. | 5 |
| Bakery product of example 1 stored at 47° C. | 6 |

The results of the comparative tests are summarized in Table 3.

TABLE 3

| | | Ref. n° | | | | | |
|---|---|---|---|---|---|---|---|
| Storage period | | 1 | 2 | 3 | 4 | 5 | 6 |
| Day 0 | Volume (%) | 100 | 100 | 100 | 100 | 100 | 100 |
| Day 7 | Volume (%) | 100 | 93 | 94 | 97 | 95 | 94 |
| Day 21 | Volume (%) | 98 | 97 | 97 | 100 | | |
| Day 35 | Volume (%) | 98 | 96 | 92 | 103 | | |
| Day 63 | Volume (%) | 96 | 98 | 79 | 102 | | |

"Volume (%)" refers to the volume of baked product in relative percentage against the bread volume measured at day 0.

From the results summarized in Table 3, it can be concluded that the powdered composition of the bakery product of the invention is very stable.

After two years-equivalent of storage, the gassing power activity has been measured (carrying out a commonly used baking process, known from the skilled person, in which the volume obtained is directly correlated to the gassing power of the yeast) at 95%, which is considered as stable for a normal instant active dry yeast.

After 2 years-equivalent of storage, the percentage obtained with the powdered composition of a bakery product of example 1 is very similar to the one obtained when the powdered composition is packaged under vacuum. But after these 2 years-equivalent of storage, the powdered composition of a bakery product of the invention has a better powder structure compared to the powdered composition packaged under vacuum.

Example 3

A powdered composition is prepared by admixing:
A sourdough product produced by blending the above mentioned ingredients. The sourdough is dried and put into powder form. The residual humidity content is 5% based on the weight of the sourdough. In other words, the dry matter of the sourdough is 95%,
instant active dry yeast with a 96% dry matter,
hydrolysed proteins,
Ascorbic acid,
Enzymes: Bel'ase A75® which is a fungal amylase (BELDEM, Belgium) and Bel'ase B210®, which is a bacterial xylanase (BELDEM, Belgium), and
Salt.

The proportions of the different components used in the powdered composition are summarised in Table 4.

TABLE 4

| Compound | Proportion | Proportion |
| --- | --- | --- |
| Sourdough | 458.33 | 460.33 |
| Instant active dry yeast | 154.02 | 154.02 |
| Ascorbic acid | 1.5 | 1.5 |
| Bel'ase B210 (Beldem, BELGIUM) | 0.5 | 0.5 |
| Bel'ase A75 (Beldem, BELGIUM) | 0.25 | 0.25 |
| Hydrolysed proteins | 50 | 50 |
| Salt | 333.4 | 333.4 |
| Total | 998 | 1000 |

The powdered composition is sealed, under nitrogen, in a container (a multilayer based films with barriers against oxygen and humidity), so that a headspace of 5% based on the volume of said container is left, filled with the nitrogen. The residual oxygen content is 1% based on the gas-phase volume in the container.

Example 4

Another powdered composition is prepared by admixing:
instant active dry yeast with a 96% dry matter,
an emulsifier: Multec SSL 3000%,
Ascorbic acid,
Enzymes: Bel'ase A75® which is a fungal amylase (BELDEM, Belgium) and Bel'ase B210®, which is a bacterial xylanase (BELDEM, Belgium), and The proportions of the different components used in the powdered composition are summarised in Table 5.

TABLE 5

| Compound | Proportion |
| --- | --- |
| Multec SSL 3000 ® | 200 |
| Instant active dry yeast | 787.3 |
| Ascorbic acid | 9 |
| Bel'ase B210 (Beldem, BELGIUM) | 3 |
| Bel'ase A75 (Beldem, BELGIUM) | 0.7 |
| Total | 1000 |

The powdered composition is sealed, under nitrogen, in a container (a multilayer based films with barriers against oxygen and humidity), so that a headspace of 5% based on the volume of said container is left, filled with the nitrogen. The residual oxygen content is 1% based on the gas-phase volume in the container.

Example 5

Bread is baked following the recipe described below.
Each dough consists of 2000 units of flour, 1280 units of water, 40 units of salts and 0.75%—based on the weight of the flour—of the powdered composition of the (bakery) product (or product for bakery industry) of example 4, after storage at 20° C. for different period of time. The temperature of the water is 18° C. The ingredients are mixed during two minutes, then six minutes, with the temperature of the dough maintained at 29.4° C.

A comparative test is performed by preparing:
Different sets of dough with a composition (having the same ingredients as the (bakery) product (or product for bakery industry) of the invention, in the same proportions) packaged under vacuum, and stored also for different period of time, and
another set of dough with all the ingredients put separately.

The following observations, as summarized in Table 6, were made when the dough was prepared with a powdered composition that was stored for different period of time, in different conditions.

TABLE 6

| | | Conditions | | |
| --- | --- | --- | --- | --- |
| Storage period | | (1) | (2) | (3) |
| Day 0 | Volume (ml) | 2775 | 2765 | 2765 |
| 3 months | Volume (ml) | 2825 | 2750 | 2760 |
| 6 months | Volume (ml) | 2900 | 2745 | 2750 |
| 9 months | Volume (ml) | 2775 | 2750 | 2745 |
| 12 months | Volume (ml) | 2775 | 2750 | 2760 |

(1) All ingredients used separately
(2) composition packaged under vacuum and stored at 20° C.
(3) powdered composition of the (bakery) product (or product for bakery industry) of the invention prepared according to example 4, stored at 20° C.

From Table 6, it can be derived that the powdered composition of the (bakery) product (or product for bakery industry) of the invention is stable.

After 12 months of storage, the volume obtained with the powdered composition of a (bakery) product (or product for bakery industry) of example 4 is slightly better than the one obtained when the powdered composition is packaged under vacuum. And it could be noticed after 12 months of storage that the powdered composition packaged under vacuum had the tendency to form a block, losing its powder form. To the contrary, the powdered composition of a bakery product of example 4 had kept its powder structure.

Example 6

A powdered composition is prepared by admixing:
a sourdough product (dough fermented by lactic acid bacteria and/or yeast, dried and put into powder form) with a residual humidity content of 5% based on the weight of the sourdough,
instant active dry yeast with a 96% dry matter,
hydrolysed proteins,
Ascorbic acid, and
Enzymes: Bel'ase A75® which is a fungal amylase (BELDEM, Belgium) and Bel'ase B210®, which is a bacterial xylanase (BELDEM, Belgium).

The proportions of the different components used in the powdered composition are summarised in Table 7.

TABLE 7

| Compound | Proportion |
|---|---|
| Sourdough | 690.51 |
| Instant active dry yeast | 231.11 |
| Ascorbic acid | 2.25 |
| Bel'ase B210 (Beldem, BELGIUM) | 0.75 |
| Bel'ase A75 (Beldem, BELGIUM) | 0.38 |
| Hydrolysed proteins | 75 |
| Total | 1000 |

The powdered composition is sealed, under nitrogen, in a container (a multilayer based films with barriers against oxygen and humidity), so that a headspace of 5% based on the volume of said container is left, filled with the nitrogen. The residual oxygen content is 1% based on the gas-phase volume in the container.

In fact the powdered composition is the same as described in example 3 the salt excepted (there is no salt added in the present example).

It has been observed that the absence (or presence) of salt does not influence the stability of the powdered composition packaged under inert atmosphere according to the invention (for instance after being stored at 47° C. during 7 days) the results obtained, having regard to the volume (%) measured such as in example 2 or 7, were very similar for powdered compositions, with or without salt, packaged under inert atmosphere according to the invention.

Indeed, the salt can be added while preparing the dough.

Example 7

A stability follow-up is made by preparing doughs using two products for bakery industry of the invention, prepared according to examples 1 and 3, which have been stored at 47° C. during 1 week.

Storage conditions at 47° C. during 1 week are considered to reflect the stability of the yeast for a period of two years.

Each dough consists of 280 g of flour, 162 ml of water and 6%—based on the weight of the flour—of a powdered composition of the products for bakery industry of the invention after 1 week. of storage at 47° C. The temperature of the water is 30° C. The ingredients are mixed during six minutes, with the temperature of each dough maintained at 30° C.

Comparative tests are also performed by preparing in parallel two sets of dough having the same ingredients, in the same proportions, wherein the powdered compositions are stored in different conditions at 20° C. during 1 week, 2 weeks, etc.

The results of the comparative tests are summarized in Table 8.

TABLE 8

| Storage period | | Open pack at room T° | Product of ex. 1 | Open pack at room T° | Product of ex. 3 |
|---|---|---|---|---|---|
| week 0 | Volume (%) | | 100% | 100% | 100% |
| Week 1 | Volume (%) | | 95% | 86% | 97% |
| Week 2 | Volume (%) | 98% | | | 100% |
| Week 3 | Volume (%) | 96% | 98% | | 100% |
| Week 4 | Volume (%) | 95% | 93% | 77% | |
| Week 5 | Volume (%) | 91% | | | 96% |
| Week 6 | Volume (%) | 85% | | 79% | 90% |
| Week 7 | Volume (%) | 83% | 96% | 75% | |

TABLE 8-continued

| Storage period | | Open pack at room T° | Product of ex. 1 | Open pack at room T° | Product of ex. 3 |
|---|---|---|---|---|---|
| Week 8 | Volume (%) | | | | |
| Week 9 | Volume (%) | 78% | | 80% | 90% |
| Week 10 | Volume (%) | | | | |
| Week 11 | Volume (%) | 75% | 95% | 64% | 94% |
| Week 12 | Volume (%) | | | | |
| Week 13 | Volume (%) | | | | |
| Week 14 | Volume (%) | | | | |
| Week 15 | Volume (%) | 38% | 93% | 58% | 92% |
| Week 16 | Volume (%) | | | | |
| Week 17 | Volume (%) | 19% | | 51% | |
| Week 18 | Volume (%) | | | | |
| Week 19 | Volume (%) | | | | |
| Week 20 | Volume (%) | | 90% | 47% | |

"Volume (%)" refers to the volume of baked product in relative percentage against the bread volume measured at day 0.

From the results summarized in Table 7, it can be concluded that the powdered composition of the bakery product of the invention is very stable.

After two years-equivalent of storage, the gassing power activity has been measured (carrying out a commonly used baking process, known from the skilled person, in which the volume obtained is directly correlated to the gassing power of the yeast) at 95% and 97% respectively for a powdered composition packaged under inert atmosphere according to example 1 and 3, which is considered as stable for a normal instant active dry yeast.

The invention claimed is:

1. A product for the bakery industry comprising a a sealed container filled with a powdered composition, said powdered composition comprising an improver composition, an active yeast, and at least 46% by weight of a dried sourdough, wherein the headspace of said container after sealing is at least 5% of the total volume of said container, the said headspace consisting of atmosphere, wherein the said atmosphere in said container after sealing comprises less than 2% of oxygen based on the gas-phase volume and wherein the said powdered composition has a dry matter content of at least 90%.

2. A product according to claim 1, wherein said powdered composition further comprises a flavour improvement composition, and/or (a) flavour improvement compound(s) and/or salt.

3. A product according to claim 1, wherein said improver composition comprises:
   one or more enzymes selected from the group consisting of amylases, xylanases, lipases, oxidases, dehydrogenases, laccases and proteases, and/or
   one or more oxidizing or reducing agents; and/or
   one or more emulsifiers; and/or
   one or more fatty materials; and/or
   one or more vitamins; and/or
   one or more sources of fiber; or
   a mixture of two or more thereof.

4. A product according to claim 2, wherein said flavor improvement compound(s) comprise(s) one or more natural aroma compounds, one or more chemical aroma compounds, one or more acids and/or one or more acidifying agents, or a mixture of two or more thereof.

5. A product according to claim 1, wherein said atmosphere consists of nitrogen, argon, helium, or carbon dioxide, or a mixture of two or more thereof.

6. A product according to claim 2, wherein said flavor improvement composition and said active yeast have a dry matter of at least 94%.

7. A product according to claim 2, wherein the residual oxygen content is less than about 1%, based on the gas-phase volume in the container, after sealing.

8. A product according to claim 2, wherein said powdered composition has a dry matter content of at least 94%.

9. A product according to claim 2, wherein the container is a multilayer based film impermeable to oxygen and to humidity.

10. A process for the preparation of a product for the bakery industry comprising the steps of:
   admixing an improver composition, an active yeast, and at least 46% by weight of a dried sourdough, the said improver composition, active yeast, dried sourdough and dried sponge being in powder form;
   filling a container with the resulting powdered composition; and
   sealing said container while leaving a headspace of at least 5% based on the volume of said container, said headspace consisting of an atmosphere, wherein the said powdered composition has a dry matter content of at least 90% and wherein the said atmosphere in said container after sealing comprises less than 2% of oxygen based on the gas-phase volume.

11. A process according to claim 10, wherein said improver composition comprises:
   one or more enzymes selected from the group consisting of amylases, xylanases, lipases, oxidases and proteases; and/or
   one or more oxidizing or reducing agents; and/or
   one or more emulsifiers; and/or
   one or more fatty materials; and/or
   one or more vitamins;
   one or more sources of fiber; or
   a mixture of two or more thereof.

12. A product according to claim 2, wherein said atmosphere consists of nitrogen, argon, helium, or carbon dioxide, or a mixture of two or more thereof.

13. A method of preparing bread, cake, biscuits, pastries, snacks or pizzas comprising combining dough with the product of claim 1.

14. A process according to claim 10, wherein said atmosphere consists of nitrogen, argon, helium, or carbon dioxide, or a mixture of two or more thereof.

15. A product according to claim 1, wherein said active yeast have a dry matter of at least 94%.

16. A product according to claim 1, wherein the residual oxygen content is less than about 1%, based on the gas-phase volume in the container, after sealing.

17. A product according to claim 1, wherein the powdered composition has a dry matter content of at least 94%.

18. A product according to claim 1, wherein the container is a multilayer based film impermeable to oxygen and to humidity.

19. A product according to claim 2, wherein said improver composition comprises:
   one or more enzymes selected from the group consisting of amylases, xylanases, lipases, oxidases and proteases; and/or
   one or more oxidizing or reducing agents; and/or
   one or more emulsifiers; and/or
   one or more fatty materials; and/or
   one or more vitamins;
   one or more sources of fiber; or
   a mixture of two or more thereof.

20. A process according to claim 10, further comprising adding a bread flavor improvement composition in powdered form.

21. A process according to claim 10, further comprising adding (a) bread flavor improvement compound(s) in powdered form.

22. A process according to claim 10, further comprising adding salt.

23. The product of claim 1, wherein the headspace of said container, after sealing, is at least about 20% of the total volume of said container.

24. The product of claim 1, wherein the powdered composition comprises improver at a level between 0.225% and 21.27% by weight of the powdered composition.

25. The product of claim 1, wherein the powdered composition comprises active yeast at a level between 12.915% and 78.73% by weight of the powdered composition.

26. The product of claim 1, wherein the powdered composition comprises up to 69.051% sourdough product by weight of the powdered composition.

27. The product of claim 1, wherein the powdered composition is packed under no vacuum.

* * * * *